Sept. 28, 1937.      R. A. NORLING      2,094,185
HAMMER ATTACHMENT FOR DRILLS
Filed April 29, 1935      2 Sheets-Sheet 1
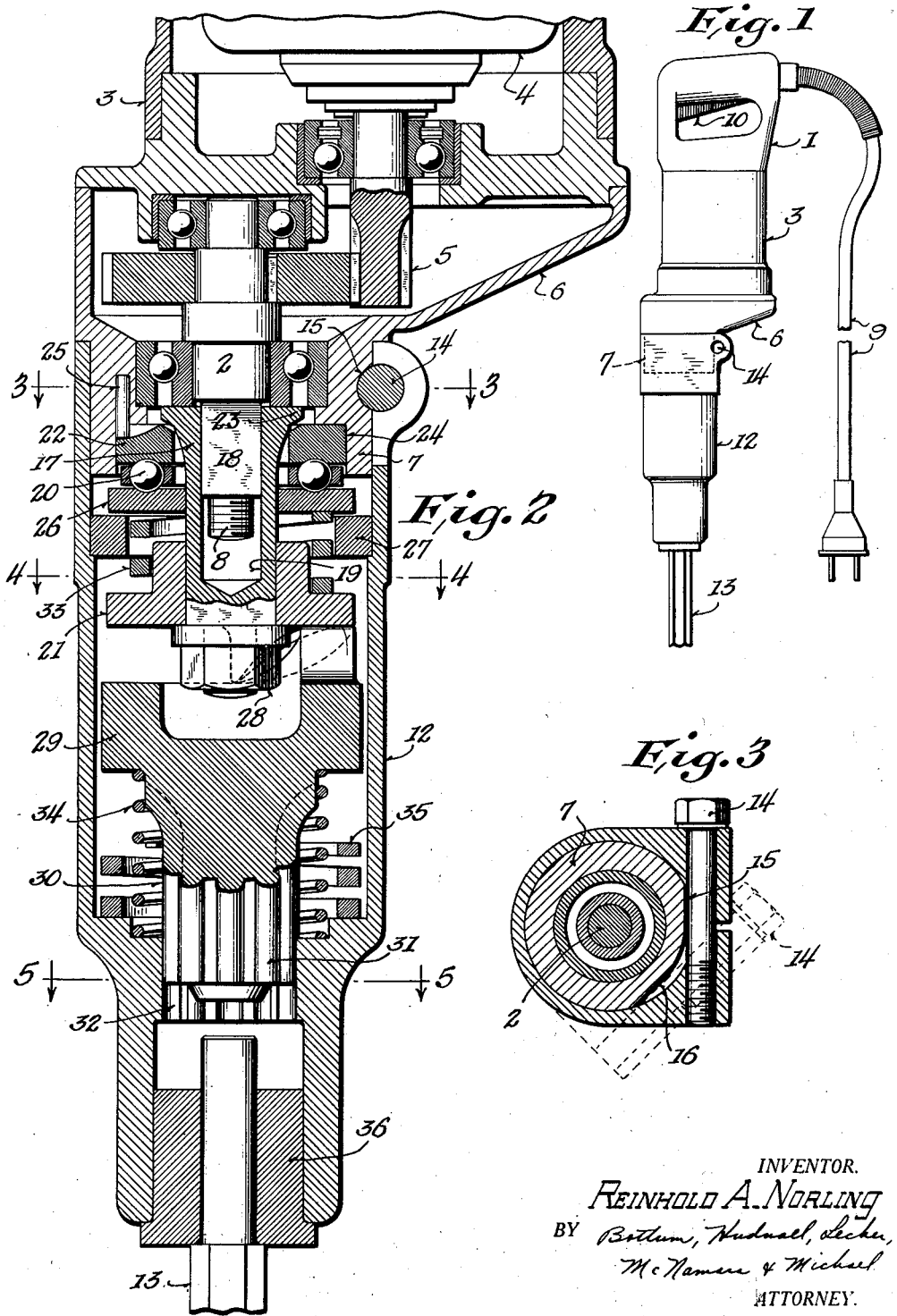
INVENTOR.
REINHOLD A. NORLING
BY Bottum, Hudnall, Lecher,
McNamara & Michael
ATTORNEY.

Sept. 28, 1937.  R. A. NORLING  2,094,185
HAMMER ATTACHMENT FOR DRILLS
Filed April 29, 1935   2 Sheets-Sheet 2
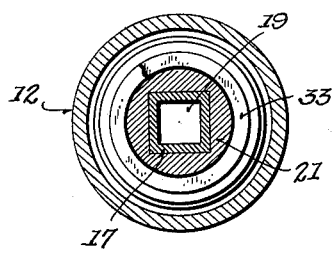
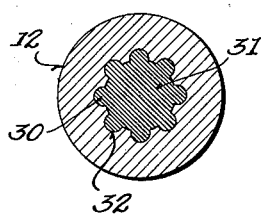
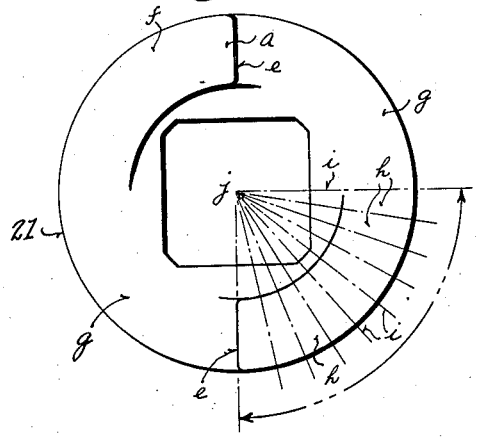
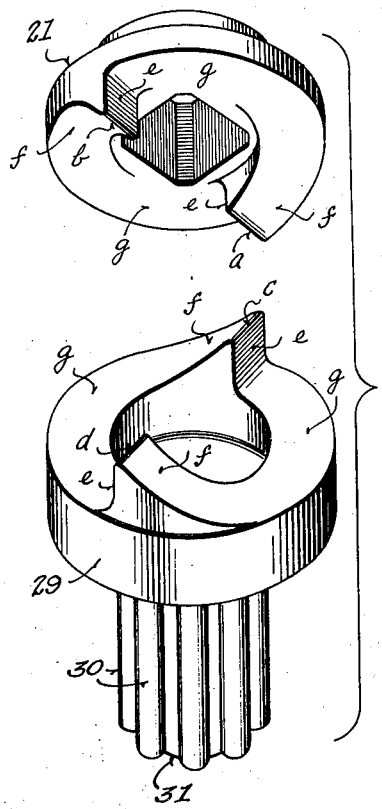
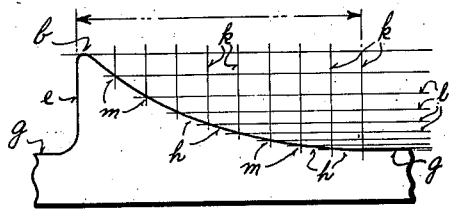
INVENTOR.
REINHOLD A. NORLING
BY
ATTORNEY.

Patented Sept. 28, 1937

2,094,185

UNITED STATES PATENT OFFICE 2,094,185

HAMMER ATTACHMENT FOR DRILLS

Reinhold A. Norling, Aurora, Ill., assignor to Independent Pneumatic Tool Co., Chicago, Ill., a corporation of Delaware Application April 29, 1935, Serial No. 18,866

7 Claims. (Cl. 125—33)

This invention relates to electric hammers and more particularly to a hammering device for application to the rotary spindle of a portable electric drill of the customary type in place of the chuck for converting the drill, when desired, into an electric hammer for use in wrecking machinery, plumbing installations, building construction, drilling and channelling concrete, brick and the like, and other operations requiring an impact tool.

The present application is a substitute for and a continuation in part of my co-pending application, Serial No. 647,936, filed December 19, 1932, for Hammering attachment for drills.

The general purpose and object of my invention is to provide a hammering device in a form of an attachment for these tools, the device being so constituted that it comprises a single and self-contained fixture readily and easily applied to and removed from the tool and establishing driving connection with the spindle of the tool on applying the device thereto.

The hammering device, in accordance with my invention, has a rotary driving member for connection with the spindle of the drill, a reciprocable hammering piston, and a reciprocable chisel or working tool to receive the blows of the piston in the rotation of the driving member by the spindle of the drill.

The piston is freely movable with respect to the driving member and the working tool and it is an important object of my invention to provide a novel cam means between the driving member and the piston for advancing the piston with an accelerated motion or velocity toward the working tool in the rotation of the driving member. This stores up kinetic energy in the freely movable piston before it strikes the working tool and such energy is utilized to deliver blows on said tool. The operating space for the piston between the driving member and the tool is such that the piston does not strike the tool until after it has been fully acted upon by the cam means and thus all of the weight and speed of the piston is utilized to deliver effective blows on the tool. With this arrangement the resilient mounting employed for the cam means is not depended upon to project the piston forwardly or deliver the blows of the piston on the working tool. Only a light spring is required to return the piston to the driving member on the return stroke of the piston and thus no undue resistance is offered to the forward movement of the piston by the cam means.

A further object of my invention is to advance the piston forwardly with an accelerated motion by providing the active surface or surfaces of the cam means of progressively increasing inclination or slope from the low to the high point of the cam. This will convert the substantially uniform rotary motion of the driving member into an accelerated reciprocatory motion for the piston, and enable the piston to deliver effective blows on the working tool.

A further object of my invention is to constitute the cam means by circumferentially spaced lugs on the driving member and the piston, respectively, said lugs having on one side cam surfaces of the character herein mentioned and abrupt shoulders on the other side whereby the piston may interfit with the driving member on the return of the piston to the driving member following each blow delivering stroke of the piston.

A further object of my invention is to provide the piston and the driving members with circumferential recesses between the shoulders and the cam surfaces of the lugs, whereby the lugs when they pass over each other in the rotation of the driving member will enter the recesses and interfit the piston with the driving member before the lugs on one member cooperate with the cam surfaces on the other to drive the piston forwardly by the driving member. These recesses are of sufficient circumferential length that the driving member may rotate to pick up speed before driving the piston forwardly.

Other and further objects of my invention will appear from the following specification taken in connection with the accompanying drawings, in which:

Fig. 1 is a side elevational view of a portable electric drill equipped with the hammering device of my invention;

Fig. 2 is an enlarged longitudinal sectional view, with parts in elevation, of my improved hammering device and associated parts of the drill;

Figs. 3, 4, and 5 are transverse sectional views taken on lines 3—3, 4—4, and 5—5, respectively, of Fig. 2 to illustrate details of the construction;

Fig. 6 is a perspective view of the piston and driving member removed from the hammering device and shown in dis-assembled or separated relation for the purpose of illustration; and Figs. 7 and 7a are views illustrating the manner in which a cam surface of the cam is formed.

The tool of Fig. 1 is a regularly constituted portable electric drill converted into an electric hammer by the application of the hammering device of my invention to the spindle of the drill in place of the chuck. The drill has a grip handle 1 at its rear end and a spindle 2 at its front end as in tools of this general character. The handle 1 is in axial alignment with the motor case 3 of the drill, which case may be integral with the handle as shown. The electric motor 4 mounted in the case 3 has its armature shaft 5 extending into a gear case 6. The latter is bolted or otherwise secured to the front end of the motor case 3. The shaft 5 is offset to one side of the spindle 2 and is geared thereto by a reducing gearing located in the case 6. The spindle 2 is journaled in a lug 7 provided on the case 6 at the front end of the tool. The spindle 2 extends outwardly from this lug and is reduced and threaded at its outer end as at 8, for connection with a chuck (not shown) when the tool is used for its regular drill operations.

The handle 1 carries the switch mechanism for controlling the supply of electric current to the motor 4 of the drill. The current is furnished to the motor through wires in a cable 9 attached to the handle as shown. The switch has a manually depressible member 10 mounted in the handle and operable by the hand of the operator grasping the handle as in drills of this character.

The hammering device of my invention comprises a housing or barrel 12 open at its inner end to fit over the lug 7 when applied thereto. The barrel 12 houses and supports the operative parts of the hammering device and also supports a working tool or chisel 13 at its outer end. The barrel 12 is releasably secured to the lug 7 by a bolt 14. The portion of the barrel fitting about the lug is split or divided longitudinally, as shown in Figs. 2 and 3, so that the barrel may be drawn into tight clamping engagement with the lug on tightening the bolt 14. The lug has a groove or recess 15 for the bolt to prevent endwise movement of the barrel off of the lug. A portion of the lug adjacent the recess 15 and to one side thereof is milled flat, as at 16, to the outer end of the lug so that the barrel and contained parts may be slid off of the lug when the barrel after loosening the bolt is turned to register the bolt with the flat portion 16 as indicated in dotted lines in Fig. 3.

Supported in the barrel 12 is an axially disposed rotary driving member 17 adapted to be connected with the spindle 2 for rotation thereby. The connection between the member 17 and the spindle 2 is of a character enabling the member to be connected with and disconnected from the spindle on sliding the barrel on and off of the lug 7. This connection, as shown in Figs. 2 and 4, comprises a square portion 18 on the spindle and a similar shape for the member 17, the latter being hollow and providing a square bore 19 to receive and fit the square portion of the spindle. The spindle and the driving member 17 are axially aligned when the barrel is applied to the lug 7, and thus the spindle enters in the member 17 on sliding the barrel on the lug.

The member 17 provides a support for its antifriction bearing 20 and its actuating cam 21. The bearing 20 is adjacent the upper end of the member 17 and the upper race ring 22 of the bearing is overlapped by an extension in the form of a flange 23 on the upper end of the member 17. This ring 22, when the hammering device is attached to the tool, seats in an outwardly opening recess 24 in the lug 7 and is held against rotation in said recess by a key in the form of a dowel 25 fitting in a groove in the ring as shown in Fig. 2. The lower ring 26 of the bearing is slidably, but non-rotatively mounted on the member 17 and extends beyond a collar 27 which has a tight fit in the barrel 12 below the ring. The collar is thus retained in position in the barrel and provides a stop, the purpose of which will presently appear. The cam 21 is also slidably, but non-rotatively mounted on the member 17 for rotation thereby. The cam is located below the collar 27 and is prevented from dropping off the lower end of the member 17 by a nut 28 applied on the reduced and threaded lower end of the driving member 17 as shown in Fig. 2. The cam 21 and the ring 26 have square openings to fit the driving member, thus providing a driving connection between them. The cam 21 is preferably annular in shape and extends beyond the collar 27 whereby the latter provides a stop for the cam, and prevents the cam and the driving member 17 from dropping out of the rear end of the barrel when the hammering device is removed from the drill.

The cam 21 operates on a piston 29 to advance the same toward the working tool 13 for delivering hammering blows on said tool. The piston is slidably, but non-rotatively mounted in the barrel 12 below the cam 21 and is in axial alignment therewith. The specific mounting shown in the drawings comprises longitudinal ribs or keys 30 on the stem 31 of the piston, which keys fit in grooves 32 in the portion of the barrel through which the piston extends to reach the working tool 13.

The member 21 and the piston 29 are provided on their opposed portions with co-acting lugs constituting the cam means, heretofore referred to, for advancing the piston with an accelerated motion toward the tool 13. This cam means constitutes an important part of my invention and will be presently described.

Expansion coiled springs 33 and 34 are employed to yieldably engage and interfit the piston with the member 21. The spring 33 surrounds the driving member 17 betwen the member 21 and the lower ring of the bearing 20 and passes through the collar 27 as shown. This spring engages the bearing ring and the member 21 and is strong enough to keep the member 21 in position to drive the piston forwardly and to cushion the shock of the piston with the member 21 on the return of the piston after each of its power strokes. The spring 34 surrounds the piston at its stem 31 and seats at its lower end against the portion of the barrel through which the piston extends to reach the working tool. The spring 34 bears at its upper end against the under side of the head of the piston and serves to return the piston to the member 21. A buffer spring 35, also of the coiled type, surrounds the piston stem exterior of the spring 34, and takes the blow of the piston to relieve the barrel of shock and jar should the hammering device be operated without a working tool in its outer end or without having the tool pressed far enough into the barrel to receive the blows of the piston. The buffer spring terminates sufficiently short of the head of the piston to be out of the path of its stroke, except when a working tool is not in position to receive the blows of the piston. The buffer spring 35 is strong or heavy enough to cushion a piston blow when struck by the piston and is a safety factor in the hammering device. The spring 34 is a light spring as its only duty is to return the piston to the member 21. Thus, the spring 34 offers very little resistance to the forward projection by the piston through the cooperating cam lugs between the piston and the member 21.

The cooperating lugs are clearly shown in Fig. 6. The lugs on the member 21 are marked a, b, while those on the piston are marked c, d. The lugs on each element are diametrically arranged and each lug has an abrupt shoulder e on one side and a cam surface f on the other side. The lugs extend axially outwardly from the members on which they are respectively provided and the members are arranged with the lugs extending toward each other so that the lugs on the piston element are in the path of rotation of the lugs on the driving element 21. The shoulders e of the lugs on each element face in opposite directions and extend axially inward from the outer ends of the lugs so that abrupt shoulders are provided for the elements to interfit or interengage as soon as the lugs on one element pass over the lugs on the other element.

When the piston 29 and the element 21 interengage, the lugs on the two elements come to rest against substantially flat circumferential surfaces g on the respective elements at the bases of the lugs. These surfaces g on each element are in the same plane which is substantially normal to the axis of rotation of the driving element. The surfaces g on the respective elements extend from the base of one lug at its shoulder e to the beginning of the cam surface f of the following lug. These surfaces have sufficient circumferential length that ample time is allowed in the relative rotation of the elements for the piston element 29 to completely interfit with the driving element 21 before the cam surfaces of the lugs on one element act on the outer ends of the lugs on the other element to project the piston forwardly in the rotation of the member 21. Thus, the piston is not projected forwardly prematurely because the two elements completely interfit before the lugs on one element are brought into operative relation with the cam surfaces on the other element. This also allows the piston to pick up speed before the cam surfaces function, whereby the driving element 21 may be rotating at its maximum speed before operating on the piston element to project it toward the working tool.

In the particular embodiment of the invention shown in the drawings, each element 21 and 29 has a pair of camming lugs. These lugs are diametrically arranged, thus enabling the driving element to project the piston element forwardly twice in each complete revolution of the driving element. Moreover, the circumferential extent of each surface g is approximately one-quarter of the circle of the element on which it is provided. Similarly the circumferential extent of the cam surface f of each lug is approximately one-quarter of the circle. Thus the driving member 21 may rotate with respect to the piston element 29 approximately ninety degrees before the cam surfaces of the two sets of lugs function to drive the piston forwardly. As shown in the drawings the opposed portions of the elements 21 and 29 are substantially equal in diameter and moreover the lugs on the two elements are disposed on the outer circumferential portions of the elements, whereby the central portions of the elements may be apertured and recessed, respectively, to receive the outer end of the shaft 17 and its clamp nut 28, (Fig. 2).

The cam surfaces f of the lugs on the two elements are similarly formed. Each surface is of a progressively increasing inclination or slope from the low to the high point of the lug, whereby as heretofore stated, the piston element is advanced toward the working tool with an accelerated motion or velocity. The manner in which such cam surface is formed or laid out is detailed in Fig. 7.

The cam surface as shown in Fig. 7 is constituted of a series of merging circumferentially extending sections marked h, h. These sections extend from the low to the high point of the cam. In the particular construction shown, the first eight sections, starting with the low point of the cam at the adjacent flat surface g, are substantially equal circumferentially, being laid out between equi-distant radial lines i, i projected outwardly across the cam surface from the center j of the cam element, which in Fig. 1 is the member 21. The last or ninth section which is at the high point of the cam or at the top of the cam lug may be somewhat wider circumferentially than the other sections to include the outer end of the lug which is preferably rounded where it merges into the shoulder e to reduce wear and promote ease of operation as the lugs on the two elements 21 and 29 pass over each other.

To determine the contour of the cam surface f, two sets of plotting lines k, l are employed as shown in Fig. 7a. The lines k are erected in right angular relation to the plane of the adjacent flat surface g at the points of intersection of the radial lines i with the outer peripheral edge of the cam element as shown. This defines the width of the sections h along the outer edge of the cam surface. The lines l are arranged parallel to the surface g and have an increased outward spacing therefrom as shown. These lines l are projected to intersect the lines k to define the contour of the cam surface f. The points of intersection are marked m, m in Fig. 7a and are joined to provide the cam surface from the low to the high point of the cam. This cam surface, as shown in Fig. 7a, is in the form of a continuous curve passing through the points m, the curve being tangential to and merging into the surface g at the first sections h.

The spacing between the lines l increases as the lines leave the surface g. The minimum spacing is between the surface g and first adjacent line l. The maximum spacing is between the outermost lines l. By this arrangement the cam sections h progressively increase in angularity or slope to the surface g from the high to the low point of the lug. This will be apparent from Fig. 7a where it will be observed that the first section h rises above the surface g to the extent of the spacing of the first line l above said surface and the succeeding sections rise above the preceding ones to the extent of the spacing between the lines l marking off such sections. Thus the slope or inclination of the cam surface increases progressively and the piston 29 will be projected forwardly at an increasing rate of speed for each succeeding section of the cam surface.

The cam surfaces f on the lugs of the two elements are similarly formed and the elements are assembled so that the cam surfaces on one element cooperate with the outer ends of the lugs on the other element to advance the piston element with an increasing velocity as the high points of the driving cam lugs approach the high points of the driven cam lugs. With the majority of the sections h of the cam surfaces substantially equal in circumferential extent and progressively sloped or inclined to the planes of their respective flat surfaces g the uniform rotary motion of the driving element 21 will be converted into an accelerated reciprocating motion in the driven member 29. This will store up kinetic energy in the driven member and enable such energy to be utilized to deliver blows on the working tool 13. The working space for the piston is sufficient for the cam to exert its full effect on the piston before the piston strikes the tool. A holder 36 is provided in the outer end of the barrel for the working tool.

In an actual embodiment of my invention as shown in the drawings, the first eight sections $h$ of each cam lug are substantially 9½ degrees in circumferential length. The corresponding length of the last or ninth section is approximately 14 degrees. The angularity of the first section $h$ to the plane of the adjacent surface $g$, which is common to all of the sections, is determined by a rise of .01 of an inch above the surface $g$. The second section rises .02 of an inch above the first section, and the third and fourth sections rise .03 and .04 of an inch, respectively, above their preceding sections. The following sections rise proportionally more. The actual dimensions for the fifth to the eighth sections, inclusive, are .055 of an inch for the fifth section, .075 of an inch for the sixth section, .10 of an inch for the seventh section and .125 of an inch for the eighth section. The last or ninth section is proportionally more, rising to the top of the lug as shown. With a cam surface of this character it is obvious that the lineal movement of the piston element 29 increases as it is projected forwardly and is thus given an accelerated motion on its power stroke.

In addition to holding the member 21 in yielding contact with the piston when these parts are engaged and also cushioning the impact of the piston with said member, when the piston is returned to the member, the spring 33 may aid in starting the piston forward on its power stroke. Should the spring be compressed when the lugs on the revolving member 21 engage the cam surfaces $f$ on the piston, the expansion of the spring will aid in driving the piston forwardly. The member 21 under these circumstances will follow the piston for only a short portion of its forward travel, and it is the cam action which delivers the flow and not the spring 33. The only opportunity offered for this spring to aid in delivering a blow is when a working tool extends into the device far enough to be hit by the piston before the outer ends of the lugs on the piston and member 21 pass over each other. Generally, the working tool does not extend that far into the device.

The hammering device herein disclosed can be used for chipping, riveting, drilling holes in concrete, brick and the like, wrecking machinery, and other impact work. The device is a self-contained, readily handleable unit, capable of being easily and quickly applied to and removed from the spindle of a customary electric drill. The shaft 17 takes over the spindle on sliding the barrel on the lug 7 and an immediate driving connection is established between the hammering device and the spindle of the drill. The cam surfaces $f$ may be confined to either the driving or the driven member, or may be employed on both members as herein shown and described. With cam surfaces merging tangentially into the adjacent flat surfaces $g$ and rising progressively upwardly from such surfaces, the action of the cam is smooth and without shock or jar. The lugs move easily onto the cam surfaces and they ride smoothly over the same. This is a follow-through action, beginning with a gradual acceleration and ending in a rapid forward movement for the piston.

The details of construction and arrangement of parts shown and described may be variously changed and modified without departing from the spirit and scope of my invention, except as pointed out by the appended claims.

I claim as my invention:

1. A hammer attachment for portable power actuated rotary drills, comprising a support in the form of a barrel open at its rear end and having a working tool support at its front end, a piston for imparting impacts to the tool when supported in the barrel and an actuating cam for the piston, both mounted in the barrel, spring means in the barrel for the cam and the piston, respectively, for urging them into engagement, a driving element in the barrel for the cam, said driving element being adjacent the rear end of the barrel and fashioned to engage and have a driving connection with the spindle of the drill on the application of the barrel thereto, a bearing in the barrel for the driving element, and means in the barrel and on the driving element, respectively, for holding said element and the cam and the bearing from dropping out of the barrel when the latter is removed from the drill.

2. A hammer attachment for portable power actuated rotary drills, comprising a support in the form of a barrel open at its rear end and having a working tool support at its front end, a piston for imparting impacts to the tool when supported in the barrel and an actuating cam for the piston, both mounted in the barrel, spring means in the barrel for the cam and the piston, respectively, for urging them into engagement, a driving element in the barrel for the cam, said driving element being adjacent the rear end of the barrel and fashioned to engage and have a driving connection with the spindle of the drill on the application of the barrel thereto, a bearing in the barrel for the driving element, and means for holding the driving element and the cam and the bearing from dropping out of the barrel when the latter is removed from the drill, said means comprising a stop on the driving element for the bearing and a collar fixed in the barrel between the cam and the bearing.

3. The combination with a portable power actuated rotary drill having a spindle and an outwardly projecting bearing lug therefor, of a hammer attachment for the drill, comprising a barrel open at its rear end to receive the lug and having a working tool support at its front end, impact producing means in the barrel, said means being connected with the drill spindle for operation thereby on applying the barrel to said lug, said barrel being split at its portion engageable over the lug, and a bolt engageable with the split portion of the barrel for clamping it on the lug, said lug having a groove to receive the bolt for holding the barrel from endwise movement off of the lug.

4. The combination with a portable power actuated rotary drill having a spindle and an outwardly projecting bearing lug therefor, of a hammer attachment for the drill, comprising a barrel open at its rear end to receive the lug and having a working tool support at its front end, impact producing means in the barrel, said means being connected with the drill spindle for operation thereby on applying the barrel to said lug, said barrel being split at its portion engageable over the lug, and a bolt engageable with the split portion of the barrel for clamping it on the lug, said lug having a groove to receive the bolt for holding the barrel from endwise movement off of the lug, said lug having a flat surface at one side of said groove, whereby the barrel may be removed from the lug on loosening the bolt and turning the barrel to register the bolt with the flat surface of the lug.

5. A hammer attachment for the spindle of a portable power actuated rotary drill, comprising a support in the form of a barrel adapted to be removably attached at its rear end to the casing of the drill about the spindle and having a tool holder at its forward end, a shaft rotatably mounted in the barrel adjacent its rear end and adapted for connection with the spindle of the drill for rotation thereby on applying the barrel to the drill casing, a cam member slidably and non-rotatably mounted on said shaft, a piston operable by the cam member and slidably mounted in the barrel between and in freely movable relation to the cam member and the tool holder and a tool in the holder, two sets of spring means located in the barrel, one on the forward side of the piston for urging the piston into engagement with the cam member and separating the piston from the tool in the holder to provide a space between the piston and the tool whereby the cam member may drive the piston toward the tool and impart energy to the piston for the delivery by the piston of hammering blows on the tool, and the other spring means being on the rear side of the cam member for urging the cam member toward the piston and serving to cushion the engagement of the piston with the cam member, and a buffer in the barrel between the piston and the tool holder to relieve the latter of blows by the piston.

6. A hammering attachment for the spindle of a portable power actuated rotary drill, comprising a barrel adapted to be detachably connected at its rear end to the drill casing about the spindle, a rotary driving element and reciprocable piston and tool elements coaxially supported in said barrel, said tool element being at the forward end of the barrel and said driving element being adjacent the rear end of the barrel and formed for connection with the drill spindle for rotation thereby on applying the barrel to the drill, said piston element being between and freely movable with respect to the driving and the tool elements, means for yieldably engaging the piston and the driving elements and moving the piston element out of driving contact with the tool element following each blow delivering stroke of the piston element, and cam means between the driving and the piston elements, said cam means having an active cam surface of a progressively increasing inclination from the low to the high point of the cam for advancing the piston element with an accelerated motion toward the tool element in the rotation of the driving element, whereby kinetic energy is stored in the piston element and is utilized in delivering blows on the tool element.

7. A hammering attachment for the spindle of a portable power operated rotary drill, comprising a barrel adapted to be detachably connected at its rear end to the drill casing about the spindle, a rotary driving element and reciprocable piston and tool elements coaxially supported in said barrel, said tool element being at the forward end of the barrel and said driving element being adjacent the rear end of the barrel and formed for connection with the drill spindle for rotation thereby on applying the barrel to the drill, said piston element being between and freely movable with respect to the tool and the driving elements, means for yieldably engaging the piston and the driving elements and moving the piston element out of driving contact with the tool element following each blow delivering stroke of the piston element, and coacting lugs on the piston and the driving elements, said lugs each having a cam surface on one side to project the piston element toward the tool element in the rotation of the driving element and a shoulder on the other side to interfit the piston and the driving elements when the lugs on one element pass over the lugs on the other element, said cam surfaces being of progressively increasing inclination from the low to the high points of the lugs to advance the piston element with an accelerated motion towards the tool element, and clearance spaces between the cam surfaces and the shoulders on the respective elements, whereby the driving element may rotate relatively to the piston element before the lugs engage to impart a blow delivering stroke to the piston element.

REINHOLD A. NORLING.